(12) United States Patent
Maldonado

(10) Patent No.: US 11,666,860 B2
(45) Date of Patent: Jun. 6, 2023

(54) METHANE DESTRUCTION APPARATUS AND METHOD OF CONVERTING FUGITIVE METHANE EMISSIONS

(71) Applicant: Thermon Canada Inc., Calgary (CA)

(72) Inventor: Alejandro Maldonado, Oakville (CA)

(73) Assignee: Thermon Canada Inc., Calgary (CA)

( * ) Notice: Subject to any disclaimer, the term of this patent is extended or adjusted under 35 U.S.C. 154(b) by 255 days.

(21) Appl. No.: 17/104,359

(22) Filed: Nov. 25, 2020

(65) Prior Publication Data
US 2022/0134283 A1 May 5, 2022

(30) Foreign Application Priority Data
Oct. 30, 2020 (CA) .............................. CA 3097513

(51) Int. Cl.
*B01D 53/86* (2006.01)
*B01D 5/00* (2006.01)

(52) U.S. Cl.
CPC ........... *B01D 53/864* (2013.01); *B01D 5/009* (2013.01); *B01D 5/0072* (2013.01); *B01D 2256/22* (2013.01); *B01D 2257/7025* (2013.01)

(58) Field of Classification Search
CPC .... B01D 53/864; B01D 5/0072; B01D 5/009; B01D 2256/22; B01D 2257/7025; B01D 5/0051; B01D 53/002; Y02C 20/20
USPC ....................................................... 422/168
See application file for complete search history.

(56) References Cited

U.S. PATENT DOCUMENTS

| | | | | |
|---|---|---|---|---|
| 9,987,592 B2* | 6/2018 | Hyde | ........................ | F23G 5/50 |
| 10,150,081 B2 | 12/2018 | Nurkowski et al. | | |
| 2013/0131199 A1* | 5/2013 | Lien | ........................ | B01D 53/22 |
| | | | | 252/373 |
| 2015/0376527 A1* | 12/2015 | Xu | ........................ | C07C 7/005 |
| | | | | 585/800 |
| 2016/0001219 A1* | 1/2016 | Ho | ........................ | C10L 3/104 |
| | | | | 96/4 |
| 2017/0183996 A1* | 6/2017 | Baker | ................ | B01D 53/1475 |
| 2018/0127336 A1* | 5/2018 | Maldonado | ............ | B01J 8/0453 |
| 2018/0169561 A1* | 6/2018 | Jonnavittula | ....... | C01B 21/0466 |

* cited by examiner

*Primary Examiner* — Tom P Duong
(74) *Attorney, Agent, or Firm* — Morgan, Lewis & Bockius LLP

(57) ABSTRACT

A methane destruction apparatus for capturing and converting fugitive methane gas emissions into carbon dioxide and water comprises a methane-capturing module for capturing the fugitive methane gas emissions and a methane conversion module for receiving captured methane from the methane-capturing module. The methane-capturing module includes a fugitive methane gas emission intake connected to an emissions line having a backpressure equal to 1 to 3 inches of water (249 to 746 Pa), a natural gas feed for feeding natural gas into the methane-capturing module, may include a relief vent for preventing overpressure within the methane-capturing module and a drain for draining liquids that have condensed within the methane-capturing module. The methane conversion module includes a conversion pad for catalytically converting the captured methane into carbon dioxide and water, a water vapour opening for outputting the water and a carbon dioxide opening for outputting the carbon dioxide.

12 Claims, 4 Drawing Sheets

METHANE DESTRUCTION APPARATUS AND METHOD OF CONVERTING FUGITIVE METHANE EMISSIONS

CROSS REFERENCE TO RELATED APPLICATIONS

This application claims the benefit of Canadian Patent Application No. 3,097,513 filed Oct. 30, 2020 entitled "Methane Destruction Apparatus and Method of Converting Fugitive Methane Emissions", which is incorporated by reference herein in its entirety.

TECHNICAL FIELD

The present invention relates to methods and systems for converting methane emissions from industrial processes.

BACKGROUND

Methane emissions from industrial processes such as oil and gas plants are an environmental concern. Methane emissions may be due to venting and flaring. In addition, some methane emissions are fugitive emissions that come from valves, pumps, regulators, joints, flanges, meters or other equipment that leak gas.

Methane ($CH_4$) is 84% more potent as a greenhouse gas (GHG) than carbon dioxide. Controlling vented and fugitive methane emissions in the oil and gas industry is thus extremely important to prevent GHG-induced climate change.

Some attempts to date in the oil and gas industry to convert methane to less pernicious carbon dioxide have been only partially successful. The prior-art converters proposed to date have been unable achieve complete conversion of methane. Furthermore, the prior-art converters involve active mechanical switching. A passive converter capable of completely converting methane would thus be highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a methane destruction apparatus for capturing and converting fugitive methane gas emissions into carbon dioxide and water. The methane destruction apparatus comprises a methane-capturing module for capturing the fugitive methane gas emissions and a methane conversion module for receiving captured methane from the methane-capturing module. The methane-capturing module includes a fugitive methane gas emission intake connected to an emissions line having a backpressure equal to 1 to 3 inches of water (249 to 746 Pa), a natural gas feed for feeding natural gas into the methane-capturing module, may include a relief vent for preventing overpressure within the methane-capturing module and a drain for draining liquefied methane that has condensed within the methane-capturing module. The methane conversion module includes a conversion pad for catalytically converting the captured methane into carbon dioxide and water, a water vapour opening for outputting the water and a carbon dioxide opening for outputting the carbon dioxide.

The present specification also discloses a method of capturing and converting fugitive methane gas emissions into carbon dioxide and water. The method entails capturing the fugitive methane gas emissions using a methane-capturing module for and converting captured methane from the methane-capturing module using a methane conversion module. Capturing the fugitive methane gas emissions using the methane-capturing module includes maintaining a backpressure equal to 1 to 3 inches of water (249 to 746 Pa) in an emissions line connected to a fugitive methane gas emission intake, feeding natural gas into the methane-capturing module via a natural gas feed, preventing overpressure within the methane-capturing module, and draining liquids that have condensed within the methane-capturing module. Converting the captured methane using the methane conversion module include catalytically converting the captured methane into carbon dioxide, catalytically converting the captured methane into carbon dioxide and outputting the water and the carbon dioxide.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Figure 1:
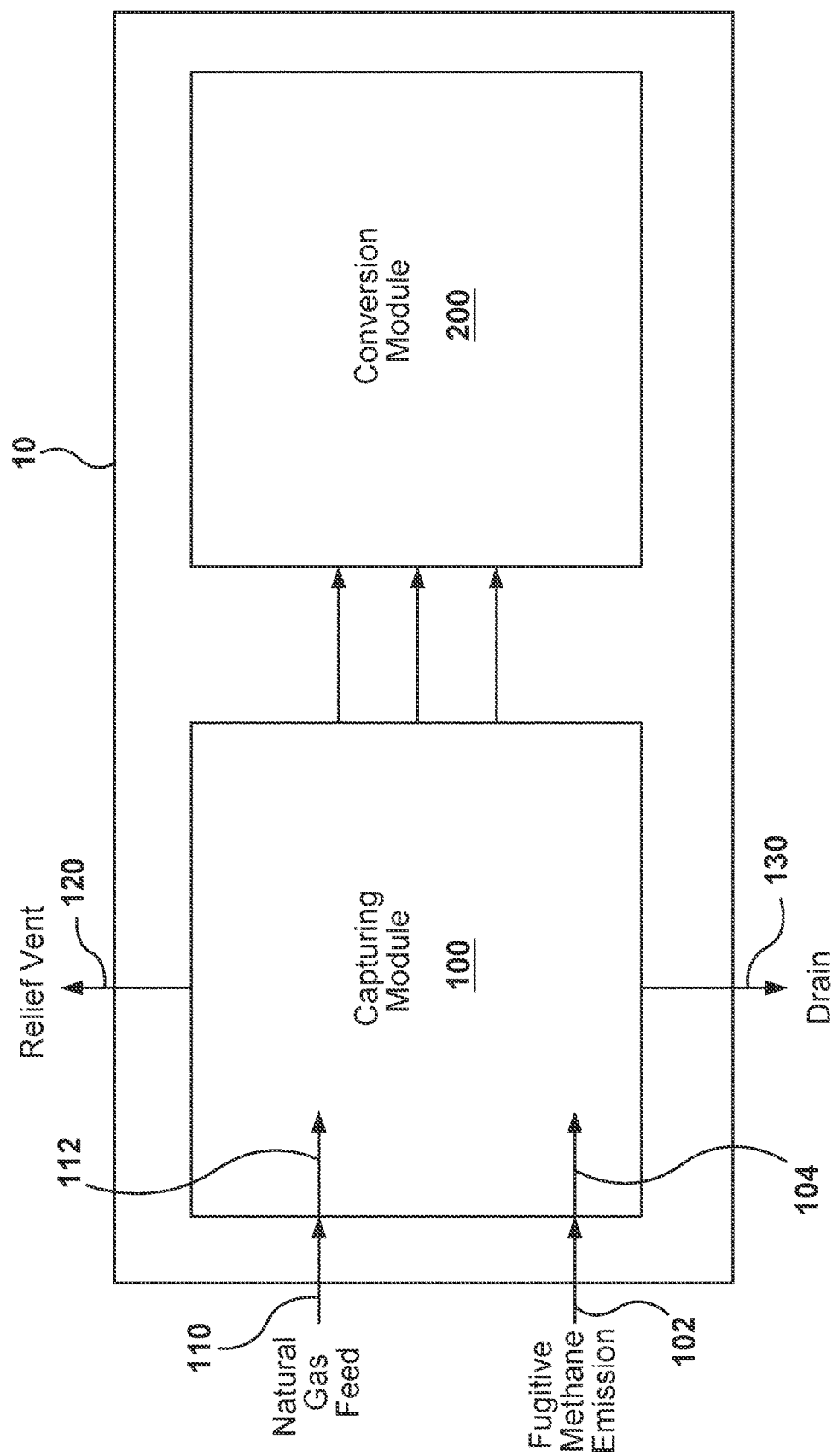
FIG. 1 schematically depicts a methane destruction apparatus for capturing and converting fugitive methane gas emissions into carbon dioxide and water in accordance with an embodiment of the present invention.

In accordance with an embodiment of the present invention, a methane destruction apparatus 10 is designed for capturing and converting fugitive methane gas emissions into carbon dioxide and water. As depicted schematically in FIG. 1, the apparatus 10 comprises a methane-capturing module 100 for capturing the fugitive methane gas emissions and a methane conversion module 200 for receiving captured methane from the methane-capturing module.

Figure 2:
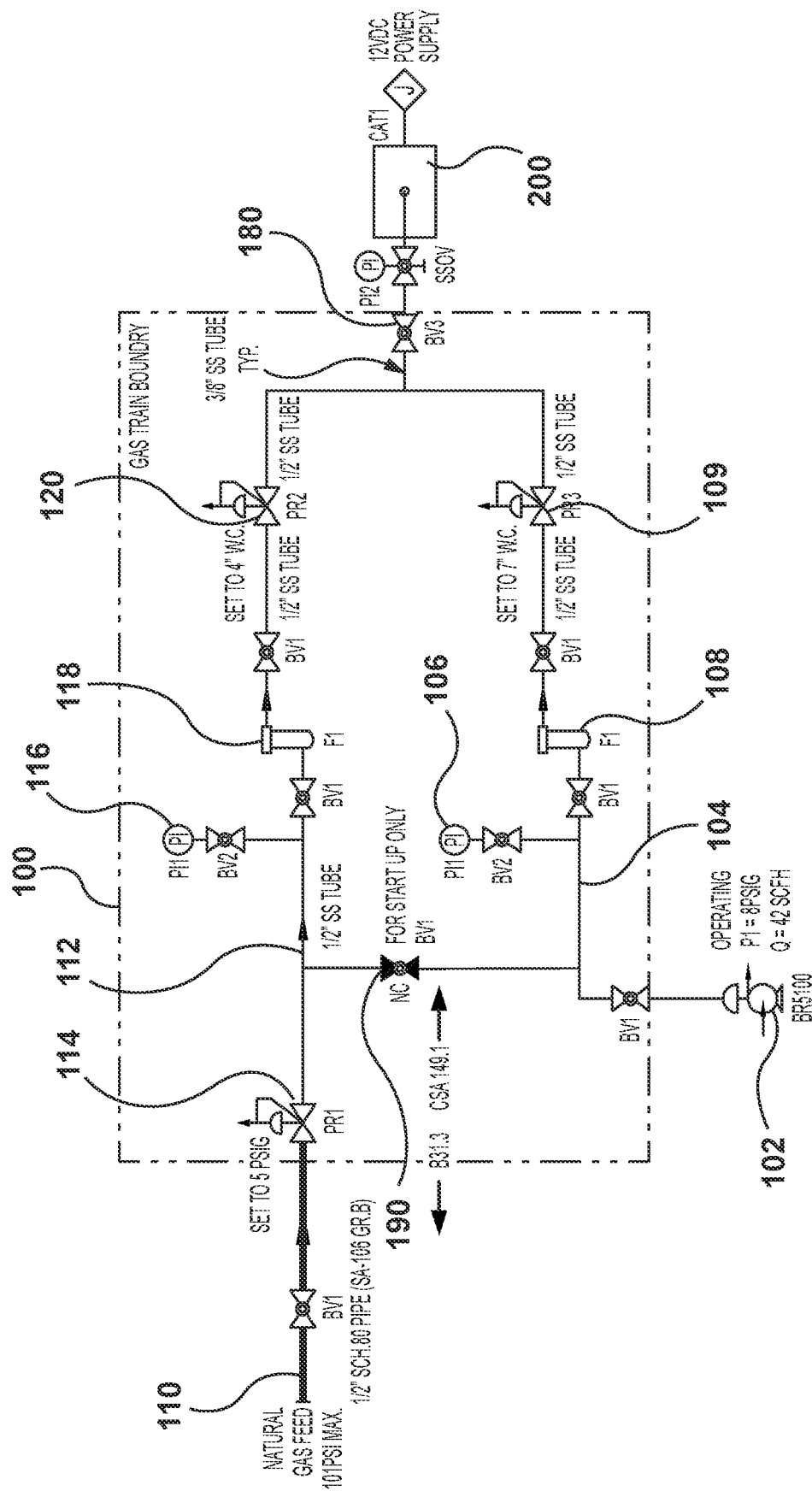
FIG. 2 presents a schematic layout of a methane-capturing module that is part of the apparatus of FIG. 1.
Figure 3:
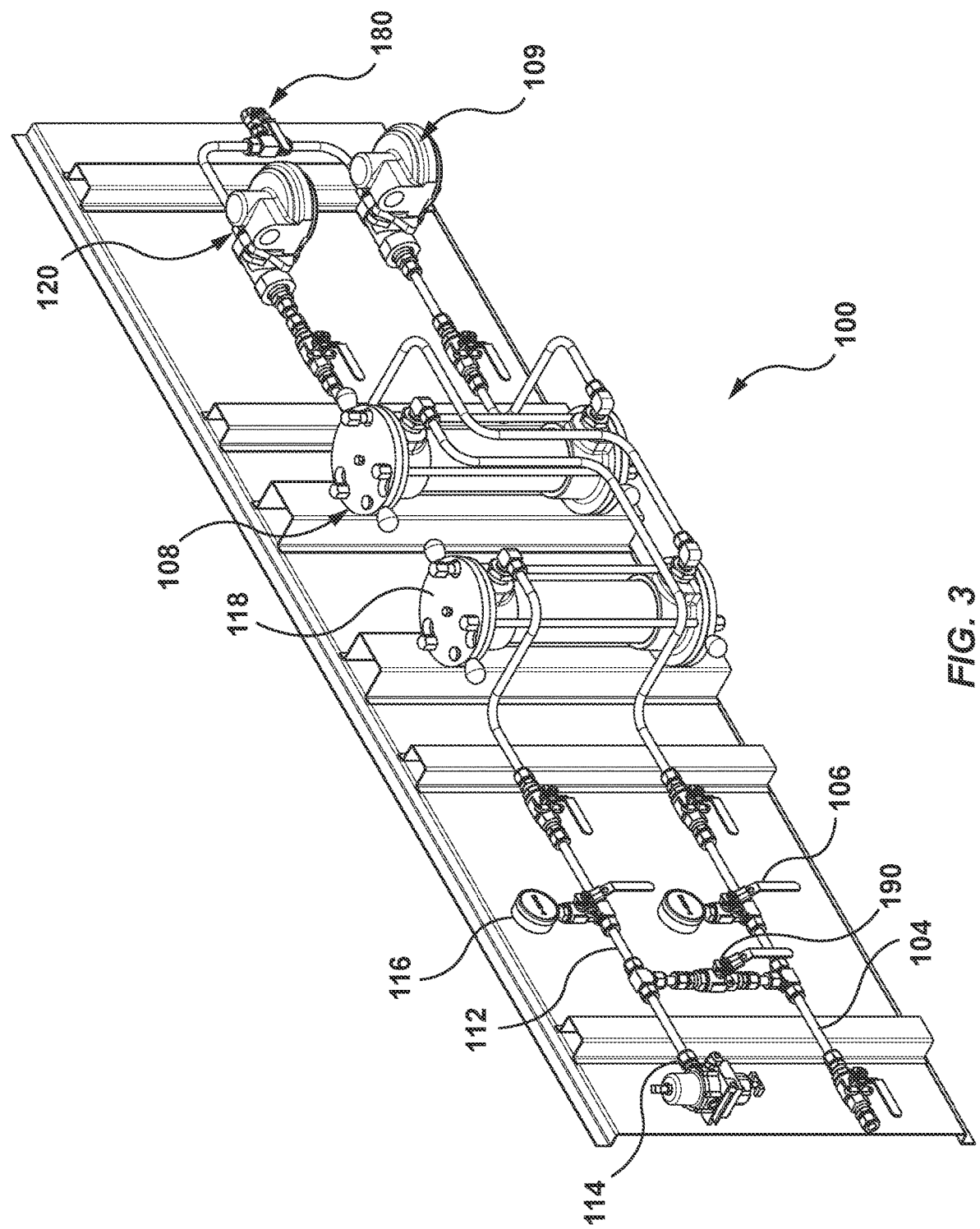
FIG. 3 illustrates a methane-capturing module in accordance with an embodiment of the present invention.

In the embodiment depicted in FIGS. 2 and 3, the methane-capturing module 100 includes a fugitive methane gas emission intake 102 connected to a captured emissions line 104. It is believed that a backpressure equal to 1 to 3 inches of water column (249 to 746 Pascals) would provide good performance. In one specific embodiment that is believed to work particularly well, the backpressure is maintained at 1 inch of water column (249 Pascals).

The methane-capturing module 100 includes a natural gas feed 110 for feeding natural gas into the methane-capturing module. The natural gas feed is connected to a natural gas line 112.

The methane-capturing module 100 may include a relief vent 120 for preventing overpressure within the methane-capturing module.

The methane-capturing module 100 includes a drain 130 for draining liquids that have condensed within the methane-capturing module.

In one embodiment, as depicted in FIGS. 2-3, the natural gas line 112 comprises a first pressure regulator 114, a first pressure gauge 116, a first filter 118 (e.g. a gas scrubber), a second regulator 120 downstream of the first filter, and an outlet valve 180 that is connected to the methane-converting module 200. Various valves may be provided as shown to selectively isolate components as needed.

In the embodiment depicted in FIGS. 2-3, the captured emissions line 104 comprises a second pressure gauge 106, a second filter 108 (e.g. a gas scrubber), and a third pressure regulator downstream 109 of the second filter. The captured emissions line 104 is also connected to the outlet valve 180 as shown.

In one embodiment, the methane-capturing module 100 comprises a normally closed valve 190 between the natural gas line 112 and the captured emissions line 104. The normally closed valve is opened during start-up.

In one specific embodiment that is believed to work particularly well, the second pressure regulator is set to 4 inches of water column and the third pressure regulator is set to 7 inches of water column.

The methane conversion module 200 includes a conversion pad 210 for catalytically converting the captured methane into carbon dioxide and water. In one embodiment, the conversion pad comprises a catalyst capable of converting methane, butane, propane and hydrogen gas.

The methane conversion module 200 for outputs water and carbon dioxide. Water released from the conversion module may be in the form of water vapor which may be emitted though the front surface of the emitter itself. The carbon dioxide may be captured using a carbon dioxide capture device. The methane conversion module may also include a gas distribution wand, safety shutoff valve(s), regulators, electrical heating elements, a liquid distribution/delivery system, and structural enclosure.

Figure 4:
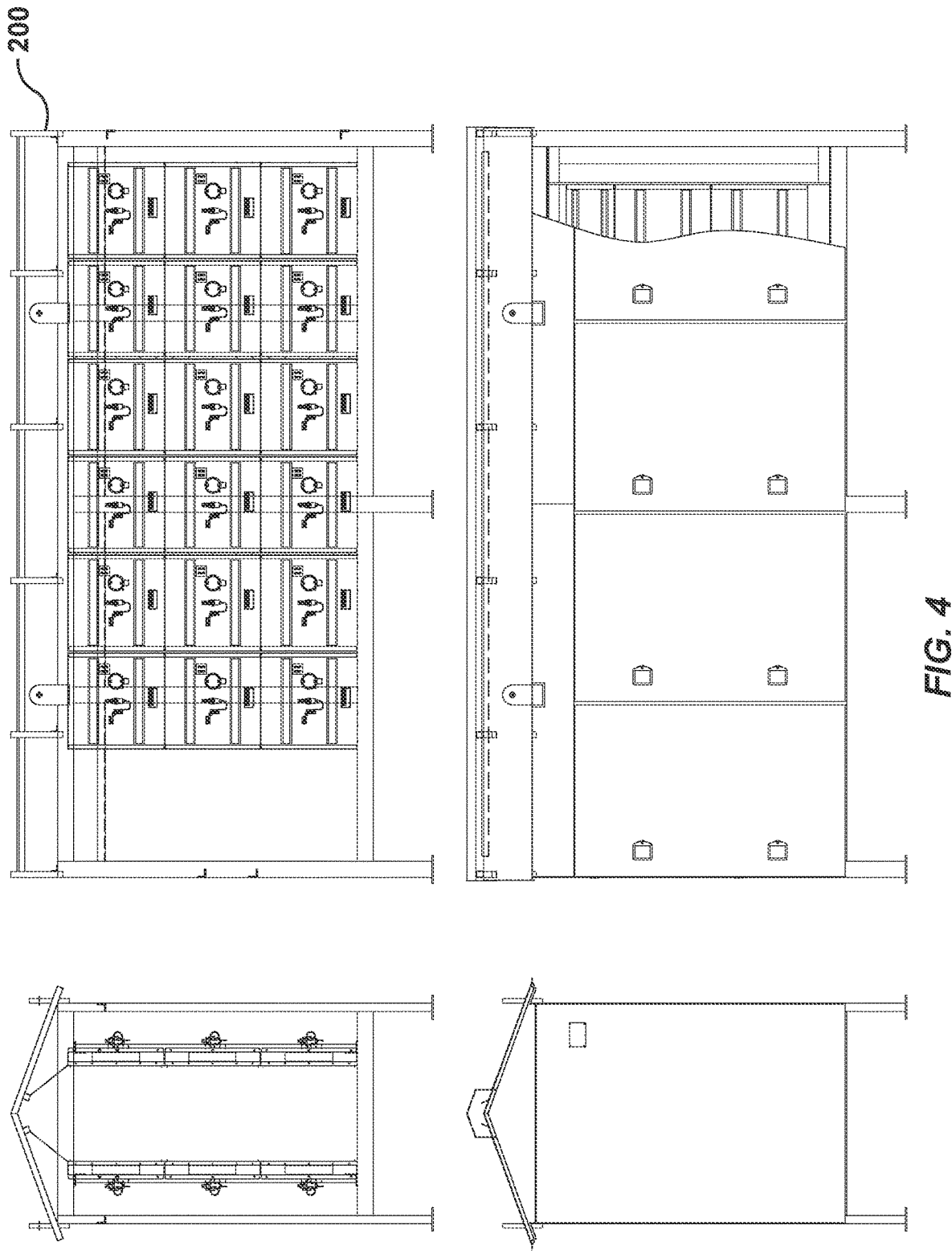
FIG. 4 illustrates another version of a methane destruction apparatus having both the methane-capturing module and the methane conversion module in accordance with another embodiment of the present invention.

FIG. 4 depicts a methane conversion module 200 in accordance with one embodiment of the present invention.

The apparatus has the unique characteristic that it can operate without the need to supply power on a continuous basis. Continuous operation may be achieved with the natural gas feed or electrical power feed for off-cycle operations when there are no fugitive methane emissions to destroy. Electrical power is required for the initial start-up. Alternatively, the apparatus can operate without electrical power by means of liquid conversion start-up as well. This start-up by means of temporary (portable) electrical power or liquid injection ("black start"). Due to the robust design of the apparatus, it may be installed in hazardous locations. It may also be designed to be portable.

Another aspect of the invention is a novel method of capturing and converting fugitive methane gas emissions into carbon dioxide and water. The method entails capturing the fugitive methane gas emissions using a methane-capturing module for and converting captured methane from the methane-capturing module using a methane conversion module. Capturing the fugitive methane gas emissions using the methane-capturing module includes maintaining a backpressure equal to 1 to 3 inches of water column (249 to 746 Pascals) in a captured emissions line connected to a fugitive methane gas emission intake, feeding natural gas into the methane-capturing module via a natural gas feed to a natural gas line, preventing overpressure within the methane-capturing module and draining liquefied methane that has condensed within the methane-capturing module. Converting the captured methane using the methane conversion module includes catalytically converting the captured methane into carbon dioxide and water.

In one specific embodiment of the method that is believed to work particularly well, the backpressure is maintained at 1 inch of water column (249 Pascals).

The method may entail filtering the natural gas in the natural gas line, regulating a natural gas pressure in the natural gas line. Likewise, the method may entail filtering the methane in the captured emissions line and regulating a methane pressure in the captured emissions line.

In one specific embodiment of the method that is believed to work particularly well, the natural gas pressure is regulated to 4 inches of water column and the methane pressure is regulated to 7 inches of water column.

In one embodiment of the method, a normally closed valve that is disposed in a pipe between the natural gas line and the captured emissions line is opened during start-up. The natural gas feed thus provides a backup supply of gas during the intermittent off-cycle of the methane emissions.

The apparatus described in this specification is able to destroy methane efficiently. Methane distribution efficiencies of 80 to 90% may be achieved.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A methane destruction apparatus for capturing and converting fugitive methane gas emissions into carbon dioxide and water, the methane destruction apparatus comprising:
   a methane-capturing module for capturing the fugitive methane gas emissions; and
   a methane conversion module for receiving captured methane from the methane-capturing module,
   wherein the methane-capturing module includes:
   a fugitive methane gas emission intake connected to a captured emissions line having a backpressure equal to 1 to 3 inches of water column (249 to 746 Pascals);
   a natural gas feed for feeding natural gas into the methane-capturing module;
   a normally-closed valve disposed between the captured emissions line and the natural gas feed, the normally-closed valve being opened during an off-cycle when the captured emissions line receives no fugitive methane gas emissions to enable the natural gas to flow into the captured emissions line;
   wherein the methane conversion module includes:
   a conversion pad for catalytically converting the captured methane into carbon dioxide and water;
   a water vapour opening for outputting the water; and
   a carbon dioxide opening for outputting the carbon dioxide.

2. The methane destruction apparatus of claim 1 wherein the natural gas feed is connected to a natural gas line that comprises a first pressure regulator, a first pressure gauge, a first filter, a second pressure regulator downstream of the first filter, and an outlet valve.

3. The methane destruction apparatus of claim 2 wherein the captured emissions line comprises a second pressure gauge, a second filter, and a third pressure regulator downstream of the second filter.

4. The methane destruction apparatus of claim 3 wherein the normally closed valve is downstream of the first pressure regulator of the natural gas feed and is upstream of the second pressure regulator of the natural gas feed.

5. The methane destruction apparatus of claim 4 wherein the second pressure regulator is set to 4 inches of water column and the third pressure regulator is set to 7 inches of water column.

6. The methane destruction apparatus of claim 1 wherein the conversion pad comprises a catalyst capable of converting methane, butane, propane and hydrogen gas.

7. The methane destruction apparatus of claim 1 wherein the backpressure is 1 inch of water column (249 Pascals).

8. The methane destruction apparatus of claim 1 comprising a relief vent for preventing overpressure within the methane-capturing module.

9. A method of capturing and converting fugitive methane gas emissions into carbon dioxide and water, the method comprising:
   capturing the fugitive methane gas emissions using a methane-capturing module for; and
   converting captured methane from the methane-capturing module using a methane conversion module,
   wherein the capturing the fugitive methane gas emissions using the methane-capturing module includes:
   maintaining a backpressure equal to 1 to 3 inches of water column (249 to 746 Pascals) in a captured emissions line connected to a fugitive methane gas emission intake;
   feeding natural gas into the methane-capturing module via a natural gas feed to a natural gas line; and
   opening a normally closed valve during an off-cycle when the captured emissions line receives no fugitive methane gas emissions to enable the natural gas to flow into the captured emissions line, wherein the normally closed valve is disposed between the natural gas line and the captured emissions line,
   wherein converting the captured methane using the methane conversion module includes catalytically converting the captured methane into carbon dioxide and water.

10. The method of claim 9 comprising maintaining the backpressure at 1 inch of water column (249 Pascals).

11. The method of claim 9 wherein a natural gas pressure is regulated to 4 inches of water column and a methane pressure is regulated to 7 inches of water column.

12. The method of claim 11 comprising disposing the normally closed valve downstream of the first pressure regulator of the natural gas feed and upstream of the second pressure regulator of the natural gas feed.

* * * * *